United States Patent [19]
Krellner

[11] Patent Number: 5,720,556
[45] Date of Patent: Feb. 24, 1998

[54] TEMPERATURE SENSOR PROBE

[75] Inventor: Theodore J. Krellner, Emporium, Pa.

[73] Assignee: Keystone Thermometrics Corporation, St. Marys, Pa.

[21] Appl. No.: 681,882

[22] Filed: Jul. 29, 1996

Related U.S. Application Data

[63] Continuation of Ser. No. 382,660, Feb. 2, 1995, abandoned.

[51] Int. Cl.$^6$ .................. G01K 7/00; G01K 1/08
[52] U.S. Cl. .................. 374/185; 374/208; 338/28
[58] Field of Search ................ 374/183, 185, 374/208; 338/22 R, 25, 28, 30

[56] References Cited

U.S. PATENT DOCUMENTS

| | | |
|---|---|---|
| 3,147,457 | 9/1964 | Gill et al. . |
| 3,890,588 | 6/1975 | Kanaya et al. . |
| 4,104,509 | 8/1978 | Van Bokestal et al. ......... 338/22 R |
| 4,166,451 | 9/1979 | Salera ......................... 338/28 |
| 4,246,786 | 1/1981 | Wiemer et al. . |
| 4,458,835 | 7/1984 | Clawson et al. . |
| 4,468,555 | 8/1984 | Adachi et al. ................. 338/22 R |
| 4,560,973 | 12/1985 | Grimm et al. ................. 338/28 |
| 4,729,672 | 3/1988 | Takagi ......................... 374/185 |
| 4,841,274 | 6/1989 | Yagher, Jr. et al. ............. 338/22 R |
| 5,046,857 | 9/1991 | Metzger et al. . |
| 5,197,805 | 3/1993 | Wilson ......................... 374/208 |
| 5,199,789 | 4/1993 | Mauric ......................... 374/208 |
| 5,207,765 | 5/1993 | Eiermann et al. ............... 374/208 |
| 5,273,360 | 12/1993 | Wyatt et al. . |
| 5,302,934 | 4/1994 | Hart et al. . |
| 5,367,282 | 11/1994 | Clem ......................... 338/22 R |
| 5,373,099 | 12/1994 | Boitard et al. ................ 174/16.3 |

FOREIGN PATENT DOCUMENTS

| | | |
|---|---|---|
| 68 042/81 | 9/1981 | Australia . |
| 2389109 | 11/1978 | France . |
| 88 02 130 | 3/1988 | Germany . |
| 92 02 705 | 4/1992 | Germany . |
| 647867 | 2/1985 | Switzerland . |

*Primary Examiner*—William A. Cuchlinski, Jr.
*Assistant Examiner*—Andrew Hirshfeld
*Attorney, Agent, or Firm*—Kirkpatrick & Lockhart LLP

[57] ABSTRACT

A thermistor probe with improved heat transfer between the housing and the thermistor element is provided which includes a housing which is adapted to be disposed in an environment with a temperature to be measured by the probe. Within the housing is a thermally conductive insert which corresponds to a cavity within the housing. The insert has an aperture with a generally rectangular cross section to receive a thermistor disk. The thermistor disk has a positive or negative temperature coefficient of electrical resistance. The generally rectangular aperture is constructed such that the thermistor disk can be inserted into the aperture in a close fitting relationship with the aperture. While the entire outer surface of the thermistor disk may not be in contact with the walls of the aperture in the insert, the heat transfer between the housing and the thermistor disk (through the insert) is greatly improved over thermistor probes of the past.

6 Claims, 3 Drawing Sheets

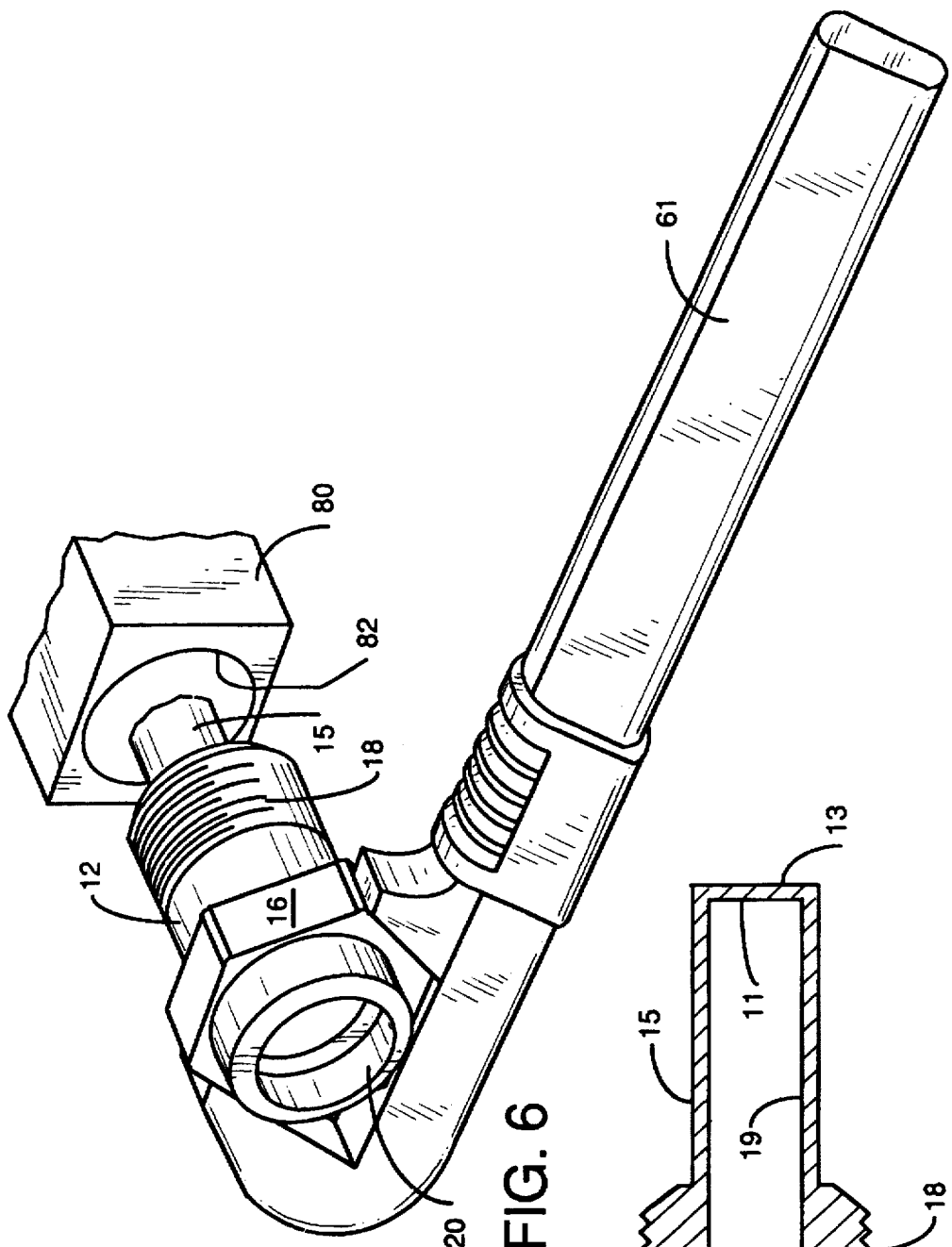

TEMPERATURE SENSOR PROBE

This application is a continuation of application Ser. No. 08/382,660, filed on Feb. 2, 1995, now abandoned.

BACKGROUND OF THE INVENTION

1. Field of the Invention

The invention generally relates to an apparatus for measuring temperature in a location remote from the observer. More particularly, the invention relates to a thermistor probe with improved heat transfer between the housing of the thermistor and the thermistor element.

2. Description of the Invention Background

The electrical conductivity of many materials is variable as a function of temperature. Such materials, when packaged as temperature sensitive resistors, are called thermistors and are often used to measure temperature. The current that flows through the thermistor and the potential drop across the thermistor is the analog of temperature.

Current and voltage changes in and across thermistors are faithfully repeatable. Thus, thermistors are theoretically accurate measuring devices. However, the accuracy that is achieved in practice depends upon ability to subject the thermistor to the temperature to be measured and to shield it from influences that operate to alter thermistor temperature from the test temperature value.

In practical applications, it is necessary to mount the sensor and to enclose and shield it. The combination of the temperature sensing element and its housing or mounting is often called a temperature probe. Its mass and the thermal conductivity of its parts may differ greatly from the mass and conductivity of the object or medium whose temperature is to be measured.

In a thermistor probe, a thermistor element is disposed within a thermally conductive housing. It is desirable to maximize the heat transfer between the housing and the thermistor element so that an accurate measurement of the temperature of the environment surrounding the housing can be obtained. In thermistor housings of the past, there has always been a relatively large amount of space between the thermistor element and the housing. If this space were to remain filled with only air, the heat transfer between the housing and the thermistor probe would be poor. Accordingly, to improve the heat transfer between the housing and the thermistor element, one solution of thermistor probes of the past was to fill the space with thermally conductive grease. While thermally conductive grease increases the heat transfer between the housing and the thermistor element, there are more efficient materials for transferring heat.

One solution of the problem of insufficient heat transfer to the thermistor element can be found in U.S. Pat. No. 3,147,457 to Gill. Gill teaches to mix the grease with aluminum powder which improves the heat transfer over grease alone. In another thermistor of the past, U.S. Pat. No. 4,246,786 to Wiemer, a thermistor probe includes a thermally conductive vane which is in contact with the thermistor element to increase heat transfer to the thermistor element. While these thermistor probes of the past have increased heat transfer over an air filled cavity, there exists a need for improved heat transfer over these thermistors of the past.

Therefore, a thermistor probe with improved heat transfer is needed.

SUMMARY OF THE INVENTION

A thermistor probe with improved heat transfer between the housing and the thermistor element is provided which overcomes the insufficient heat transfer of probes of the past. While the present invention could be used in connection with a variety of temperature sensing devices, for illustration purposes, the present invention is shown in connection with a thermistor probe.

The thermistor probe includes a housing which is adapted to be disposed in an environment with a temperature to be measured by the probe. The housing could be constructed in various shapes but is shown as cylindrical for illustration purposes only. Within the housing is a thermally conductive insert which corresponds to a cavity within the housing. The insert is shown in the shape of a cylinder for illustration purposes, but could be made in a variety of shapes. What is important is that the insert be constructed such that it is in a tight fitting relationship with the cavity of the housing. The insert could be constructed of many materials such as metal, ceramics, or highly thermally conductive plastics.

The insert has an aperture with a generally rectangular shaped cross-section to receive a thermistor disk in a close fitting relationship as described hereinbelow. The thermistor disk has a positive or negative temperature coefficient of electrical resistance, as is known. The aperture is constructed such that the thermistor disk can be inserted into the aperture in a close fitting relationship with the aperture. Alternatively, the insert could be formed around the disk in a close fitting relationship. Such close fitting relationship may include a substantial portion of the thermistor disk in actual contact with the aperture and the remainder of the thermistor disk being separated from the aperture by only a very small space relative to the size of the thermistor disk. While the insert and thermistor disk will not be in complete contact with one another, the heat transfer between the housing and the thermistor disk (through the insert) is greatly improved over thermistor probes of the past. With the thermistor probe of the present invention, there still may be a relatively small amount of space between the thermistor disk and the insert. A thermally conductive grease or a metal or alloy with a low temperature melting point such as solder can be placed in this space to further improve the heat transfer. However, much less thermally conductive grease, metal or alloy is required compared to thermistor probes of the past since the thermistor disk and insert are designed to be in a close fitting relationship with one another.

The thermistor disk may have insulated or bare lead wires on either side thereof which carry current to a means for accepting electricity such as a terminal connector. From the terminal connector, the current is carried to an electronic controller or other device which converts electrical resistance of the thermistor disk to temperature and displays the temperature of the thermistor disk or utilizes the temperture information.

These and other details, advantages and benefits of the present invention will become apparent from the detailed description of the preferred embodiment hereinbelow.

BRIEF DESCRIPTION OF THE DRAWINGS

The preferred embodiment of the invention will now be described, by way of example only, with reference to the accompanying Figures wherein like members bear like reference numerals and wherein:

FIG. 5 a cross-sectional view of the housing of the present invention taken along the line 5—5 in FIG. 1; and FIG. 6 is a perspective view of the present invention shown in connection with a wrench.

DETAILED DESCRIPTION OF THE PREFERRED EMBODIMENT

Figure 1:
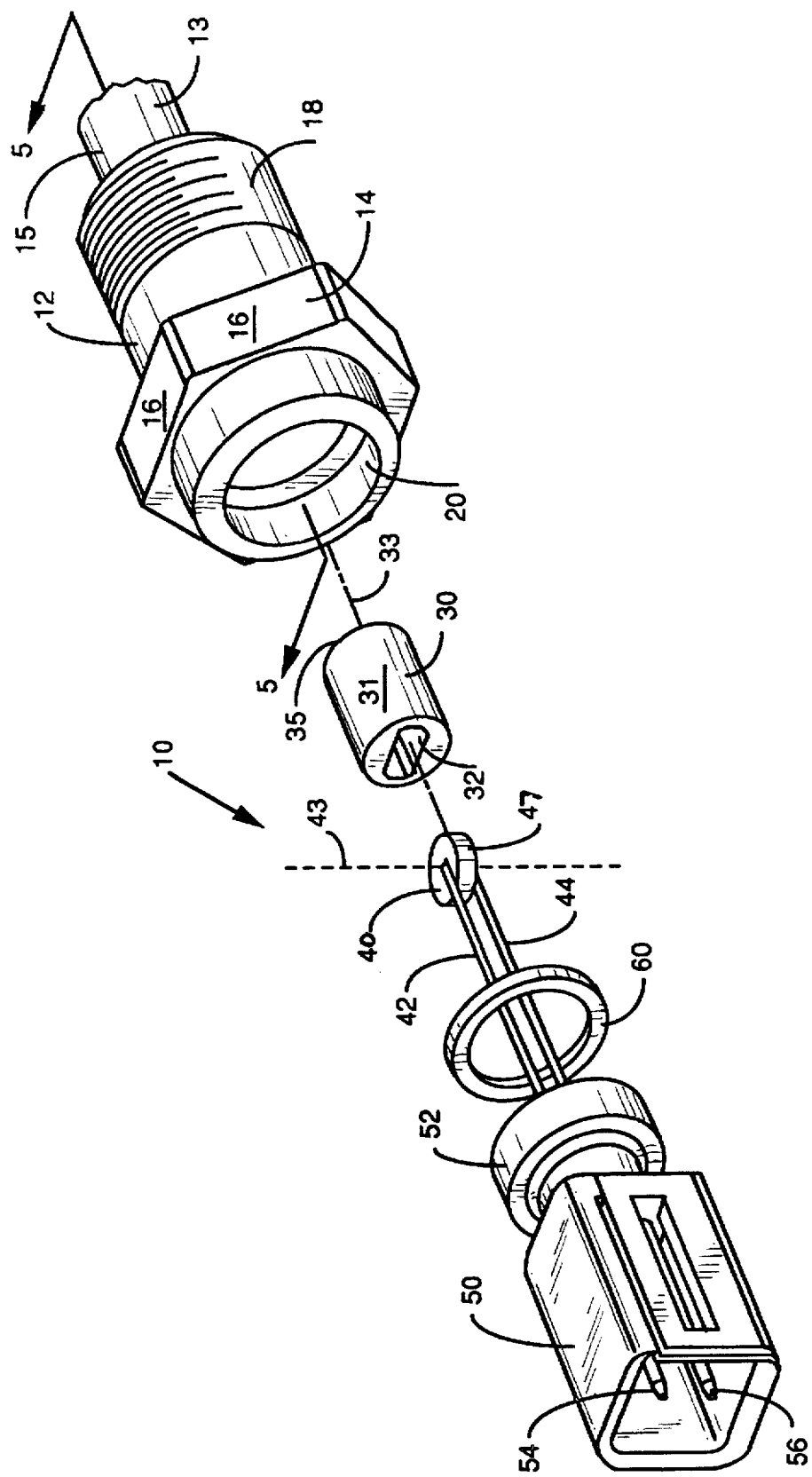
FIG. 1 is an exploded perspective view of the present invention.
Figure 2:
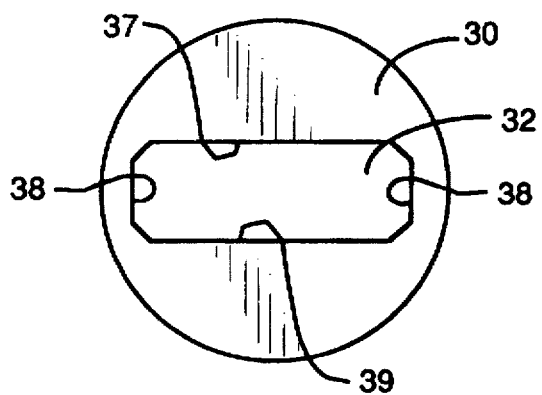
FIG. 2 is an end view of the conductive insert of the present invention.
Figure 3:
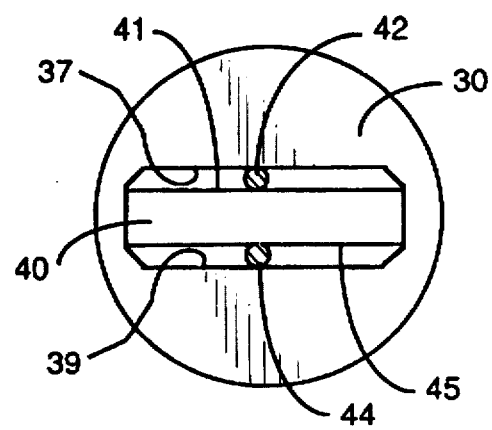
FIG. 3 is an end view of the thermistor disk and conductive insert of the present invention.
Figure 4:
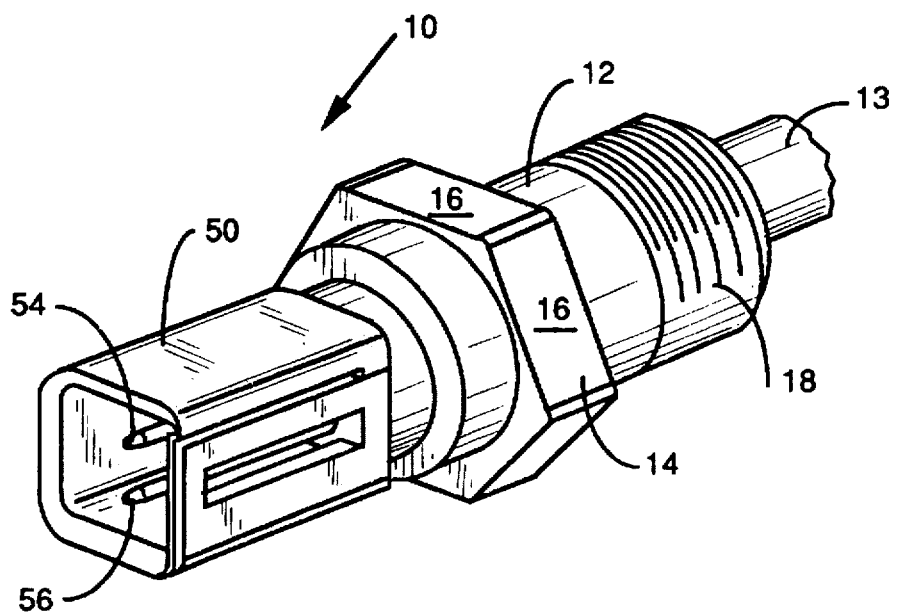
FIG. 4 is a perspective view of the present invention.

Referring now to the drawings, which are for the purpose of illustrating the preferred embodiment of the invention and not for the purpose of limiting the same, FIGS. 1–6 show the thermistor probe 10. The thermistor probe includes a housing 12, a conductive insert 30, a thermistor disk 40 and a terminal connector 50.

More particularly, and with reference to FIG. 1, the thermistor probe 10 includes generally a housing 12 for placement in an environment which has a temperature to be measured. The housing 12 is constructed of thermally conductive metal such as, for example, steel, aluminum, or brass. The housing 12 is shown as cylindrical but one skilled in the art would know that the housing could be made in a variety of shapes.

The housing 12 is provided with means for inserting the housing to an object having a temperature to be measured. Such means for inserting could include a hexagonal portion 14 having six surfaces 16 for engagement by a wrench 61 (FIG. 6). The housing 12 also includes a sensing end 13 and a threaded portion 18 for engagement with a corresponding threaded portion 82 of the object 80. The housing 12 includes an aperture 20 for receiving thermally conductive insert 30. The aperture 20 is shown circular in cross section for illustration purposes. The aperture 20 extends into the sensing end 13 and terminates in a thermistor receiving section 15.

The insert 30 is shown as cylindrical in shape such that it can be inserted through the aperture 20 and placed in a tight fitting relationship with the thermistor receiving section 15 in the housing 12. As used herein, a tight fitting relationship between the thermistor receiving section 15 and the insert 30 means that a substantial portion of the entire exterior surface 31 of the insert 30 is in contact with the interior surface 19 of the thermistor receiving section 15. Also, the end face 35 of the insert 30 may be in contact with the end face 11 of the thermistor receiving section 15. The thermistor receiving section 15 and insert 30 could be made in a variety of shapes as long as the cross section of the thermistor receiving section 15 and the insert 30 correspond to one another. The insert 30 has a central axis 33.

The thermistor element or disk 40 is preferably constructed from a semiconductor material such as a sintered metal oxide with a dielectric coating, as is known in the art and may have insulated electrical leads 42 and 44 connected thereto to carry an electrical signal to a terminal connector 50, described hereinbelow. The disk 40 has a central axis 43. The insert 30 has an aperture 32 with a generally rectangular shaped cross section to receive the thermistor disk 40. The aperture 32 is constructed such that the thermistor disk 40 can be inserted into the aperture 32 in a close fitting relationship with the aperture 32. As used herein, a close fitting relationship between the disk 40 and the aperture 32 means that the face 41 of the disk 40 may be in contact with the surface 37 of the aperture 32 and that the face 45 of the disk 40 may be in contact with the surface 39 of the aperture 32. Also, the perimeter 47 of the disk 40 may be in partial contact with the perimeter 38 of the aperture 32. Preferably, the disk 40 is oriented within the insert such that the central axis 33 of the insert 30 is perpendicular to the central axis 43 of the disk 40. While the thermistor disk 40 and aperture 32 will be in a close fitting relationship with one another, there will still be a relatively small amount of space (as compared to the thickness of the thermistor disk 40) between portions of the thermistor disk 40 and the aperture 32. Preferably, this space will be filled with a thermally conductive grease, metal or alloy with a low temperature melting point (not shown).

A terminal connector 50 has an insertion portion 52 which is disposed within the housing 12 at the end of the housing 12 opposite the thermistor receiving section 15. An annular gasket 60 preferably constructed of rubber-like substance such as silicone rubber is provided to seal the interface between the insertion portion 52 of the terminal connector 50 and the housing 12. Leads 42 and 44 are attached to opposite faces 41 and 45 of the thermistor disk 40 and extend to the terminal connector 50. The lead 42 is connected to the positive portion 54 of the terminal connector 50 and the lead 44 is connected to the negative portion 56. The positive portion 54 and the negative portion 56 are electrically isolated from one another.

In operation, the thermistor probe 10 is placed in an environment to measure the environment's temperature. The thermistor probe 10 is threaded into an object 80 in the environment using the wrench 61 on the hexagonal portion 14. The thermal energy of the environment is transmitted through the housing 12 and insert 30 to the thermistor disk 40. The thermistor disk 40 has a consistent temperature to electrical resistance relationship, as is known. An electrical current is sent through the lead 42 through the thermistor 40 and back through lead 44. The electrical current is picked up at the terminal connector 50 is carried to an electronic controller or other device (not shown) which converts electrical resistance of the thermistor disk to temperature and displays the temperature of the thermistor disk or utilizes the temperture information.

Although the present invention has been described primarily in conjunction a thermistor probe, the invention may be used with other types of temperature sensing probes. Those of ordinary skill in the art will appreciate the fact that there are a number of modifications and variations that can be made to specific aspect of apparatus of the present invention without departing from the scope of the present invention. Such modifications and variations are intended to be covered by the foregoing specification and the following claims.

What is claimed is:

1. A thermistor probe for measuring the temperature of an environment, the thermistor probe comprising:

a housing having an aperture therein;

a one-piece thermally conductive insert of a rigid material adapted to be inserted into said aperture of said housing and configured to provide a tight fitting relationship therebetween, said insert having an aperture therein, said insert aperture having a generally rectangular-shaped cross-section defined by at least top, bottom, and opposing side surfaces;

a disk-shaped thermistor element for measuring the temperature of the environment and adapted to be disposed within said aperture of said thermally conductive insert, said thermistor element insertable and removable from said insert aperture without destroying the integrity of said insert, said thermistor element configured such that the perimeter of the thermistor element contacts the side surfaces of said insert aperture and provides for a close fitting relationship between said thermistor element and said insert when said thermistor element is inserted into said insert aperture with a central axis of said thermistor element substantially perpendicular to a longitudinal axis of said housing, said insert for facilitating thermal equilibration of said environment with said thermistor element by conducting heat between said environment and said thermistor element;

means for accepting electricity; and means for conducting electricity for conducting electrical current from said means for accepting electricity to said thermistor element and for conducting said electrical current from said thermistor element back to said means for accepting electricity.

2. The thermistor probe of claim 1 wherein said conductive insert is generally cylindrical.

3. The thermistor probe of claim 2 wherein said conductive insert includes a central axis and said thermistor element is disposed within said aperture in said conductive insert such that said central axis of said thermistor element is substantially perpendicular to said central axis of said conductive insert.

4. The thermistor probe of claim 1 wherein said means for conducting electricity comprises first and second electrically conductive lead wires conductively attached to said thermistor element, and said means for accepting electricity comprises a terminal connector such that current can flow from said terminal connector to said first lead wire, through said thermistor element to said second lead wire and back to said terminal connector.

5. The thermistor probe of claim 1 wherein said housing includes means for connecting said housing to an object.

6. The thermistor probe of claim 5 wherein said means for connecting said housing to said object includes a hexagonal section adapted for engagement by a wrench and said housing further includes a threaded portion adapted for attachment to a corresponding threaded portion of said object.

* * * * *